United States Patent
Cox et al.

(10) Patent No.: US 7,313,103 B2
(45) Date of Patent: Dec. 25, 2007

(54) METHOD AND APPARATUS FOR INTERACTIVE COMMUNICATION BETWEEN HALF-DUPLEX AND FULL-DUPLEX SYSTEMS

(75) Inventors: Gregory W. Cox, Schaumburg, IL (US); Frederick H. Rohles, Hoffman Estates, IL (US); Jeffrey T. Eschbach, Schaumburg, IL (US); Jayanth P. Mysore, Streamwood, IL (US)

(73) Assignee: Motorola, Inc., Schaumburg, IL (US)

( * ) Notice: Subject to any disclaimer, the term of this patent is extended or adjusted under 35 U.S.C. 154(b) by 1002 days.

(21) Appl. No.: 10/161,438

(22) Filed: Jun. 3, 2002

(65) Prior Publication Data

US 2003/0224825 A1 Dec. 4, 2003

(51) Int. Cl.
*H04B 3/30* (2006.01)
*H04B 37/00* (2006.01)
*H04L 5/16* (2006.01)
*H04J 3/16* (2006.01)
*H04J 3/22* (2006.01)

(52) U.S. Cl. .................. 370/285; 370/278; 370/296; 370/466

(58) Field of Classification Search .............. None
See application file for complete search history.

(56) References Cited

U.S. PATENT DOCUMENTS

| | | | | |
|---|---|---|---|---|
| 3,973,089 A | * | 8/1976 | Puckette | 379/404 |
| 4,996,683 A | * | 2/1991 | Yamashita et al. | 398/30 |
| 5,349,635 A | * | 9/1994 | Scott | 379/93.34 |
| 5,680,552 A | * | 10/1997 | Netravali et al. | 709/250 |
| 5,864,544 A | * | 1/1999 | Serinken et al. | 370/282 |
| 6,134,450 A | * | 10/2000 | Nordeman | 455/517 |
| 6,169,746 B1 | * | 1/2001 | Ueda et al. | 370/466 |
| 6,243,386 B1 | * | 6/2001 | Chan et al. | 370/403 |
| 6,563,919 B1 | * | 5/2003 | Aravamudhan et al. | 379/230 |
| 6,765,882 B2 | * | 7/2004 | Rittle et al. | 370/277 |
| 2002/0040409 A1 | * | 4/2002 | Matena et al. | 709/315 |
| 2002/0129120 A1 | * | 9/2002 | Tseng | 709/218 |

* cited by examiner

*Primary Examiner*—Edan Orgad
*Assistant Examiner*—Blanche Wong

(57) ABSTRACT

A communication system (100) includes a first communication unit (101, 102, 103, 104) capable of communicating over a full-duplex persistent-connection link provided by a full-duplex network (105) and a second communication unit (151, 152) capable of communicating over a half-duplex dispatch link provided by a dispatch RF system (150). The system (100) also includes a dispatch gateway (120). The dispatch gateway (120) receives signals from a first communication unit (101, 102, 103, 104) over a full-duplex persistent link through a full-duplex network (105) and provides communication between the first communication unit and a single dispatch communication unit (151, 152) or a group of dispatch communication units (151, 152) over a half-duplex communication link through a dispatch RF system (150). The gateway operates in a manner so as to permit communication between full-duplex terminals (101, 102, 103, 104) and half-duplex terminals (151, 152).

20 Claims, 3 Drawing Sheets

100

US 7,313,103 B2

METHOD AND APPARATUS FOR INTERACTIVE COMMUNICATION BETWEEN HALF-DUPLEX AND FULL-DUPLEX SYSTEMS

TECHNICAL FIELD

The present application is directed to a communication system, and, in particular, to a system, a method and an apparatus for permitting communication between a radio network supporting half-duplex, push-to-talk communication and a network supporting full-duplex, persistent connections.

BACKGROUND

In two-way radio systems, push-to-talk represents a method of communication in which the talker is required to keep a switch activated while talking. In dispatch call processing, a mobile unit uses a half-duplex link to send voice packets to one or more mobile units. The half-duplex communication mode is referred to as push-to-talk because a button is pushed when transmitting talking and the same button is released when receiving listening. That is, after the user of the first mobile unit depresses the "talk" button, other mobile unit users are prevented from sending packets to other users in the group until the user of the first mobile unit releases the button.

A telephone network employs a full-duplex persistent connection, also known as a circuit, between terminals. In such a system, information is continuously transferred between all communicating terminals. Talk from a user of one terminal, however, does not prevent users at other terminals within a group of terminals from talking to other members of the group at any time during a group conversation or conference. All members of the group in the call are permitted equal access and share the voice channel simultaneously.

Telephone systems utilizing touch tone telephones employ DTMF Dual Tone Multi-Frequency, which assigns two specific frequencies, or tones, to each key so that it can easily be identified. With DTMF, each key pressed on a phone-terminal generates two tones of specific frequencies. These tones are generated when the user depresses a push button on the terminal. The tones are a form of in-band signaling that maybe interpreted for call-processing within a telephone system.

As the need for network interworking becomes more widespread, especially with the deployment of IP networks, there is an increasing need for service providers to interconnect with other networks that are using different signaling protocols. Network providers and operators of radio and telephony networks may employ intermediate systems proxies and call agents which may be used for inter-networking for call routing, call signaling, capabilities exchange, media control, and supplementary services.

DETAILED DESCRIPTION

This application describes a system, apparatus and method utilizing full-duplex terminals and signaling to establish a connection with a radio network utilizing and responding with push-to-talk. One example of full-duplex terminals is a standard telephone and an example of signaling in the full-duplex network is DTMF.

In the context of this application, a call lasts from the time a full-duplex terminal (e.g., 101, 102, 103, 104 shown in FIG. 1) user dials the telephone number of the dispatch gateway and the switch establishes a circuit connection until the full-duplex terminal user hangs up causing the telephony switch to release the circuit connection. During a call, several dispatch sessions may occur. A dispatch session lasts from the time push-to-talk is successfully initiated by a first user in a dispatch conversation until the time that all users remain idle for at least a preset time interval or until the dispatch system terminates or "drops" the dispatch conversation. Dispatch sessions may be initiated by the full-duplex terminal user or by dispatch RF system users.

Figure 1:
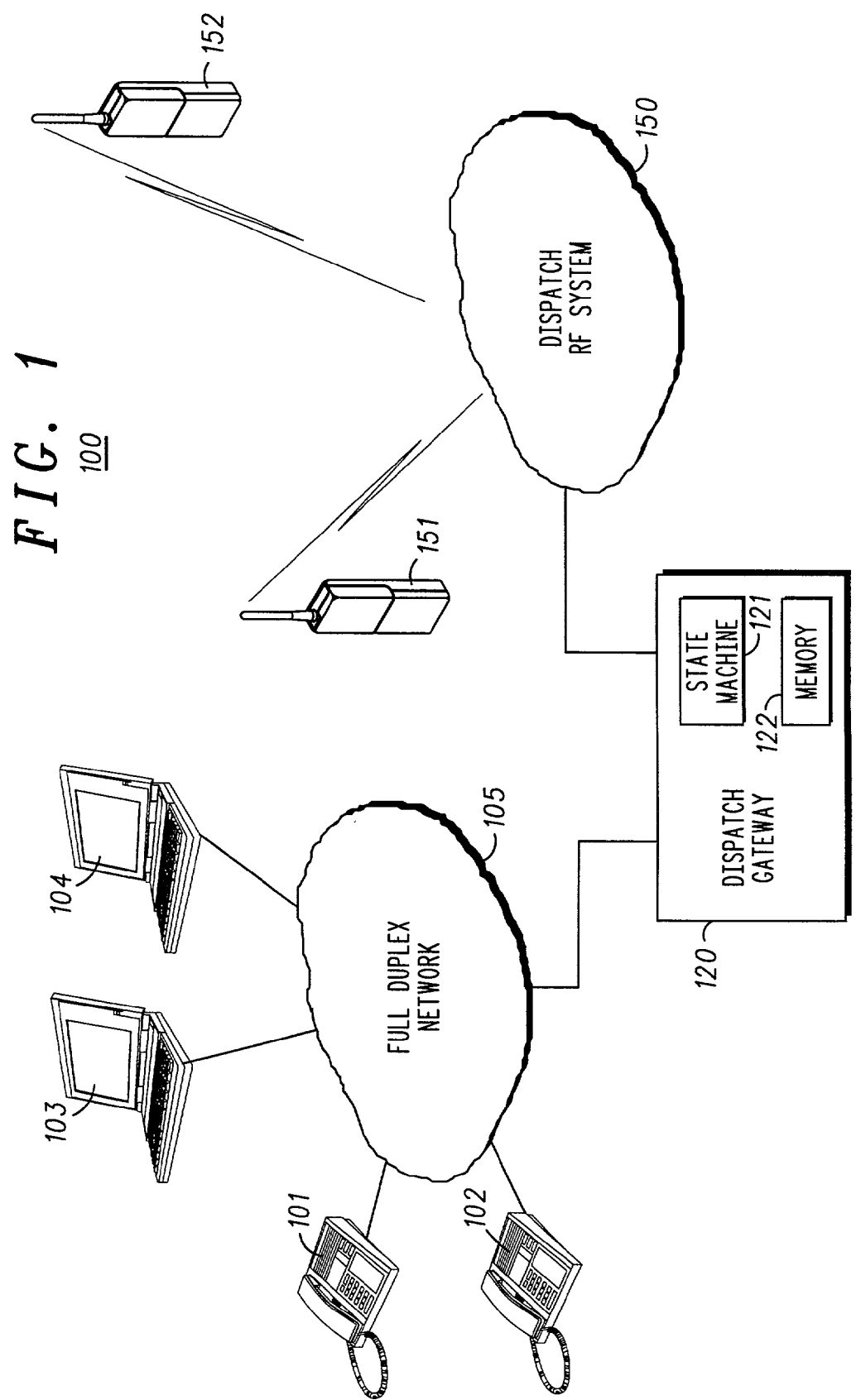
FIG. 1 is a schematic diagram of an embodiment of a communication system including an apparatus for communicating between a full-duplex telephony network and a half-duplex radio network.

With more particular reference to FIG. 1, a dispatch gateway 120 interacts with a full-duplex network 105, a dispatch RF system 150 and any intermediary devices that may be used to proxy or redirect the call between these systems. The dispatch RF system 150 may be, for example, the iDEN system produced by Motorola, Inc. of Schaumburg, Ill. Other RF dispatch systems may be used. The full-duplex network 105 may be a telephone network such as the Public Switched Telephone Network PSTN and having Plain Old Telephone Service POTS full-duplex terminal 101, 102, 103, 104s. While other full-duplex networks may be used, the PSTN example will be the one primarily used in this description for the sake of clarity.

Figure 2:
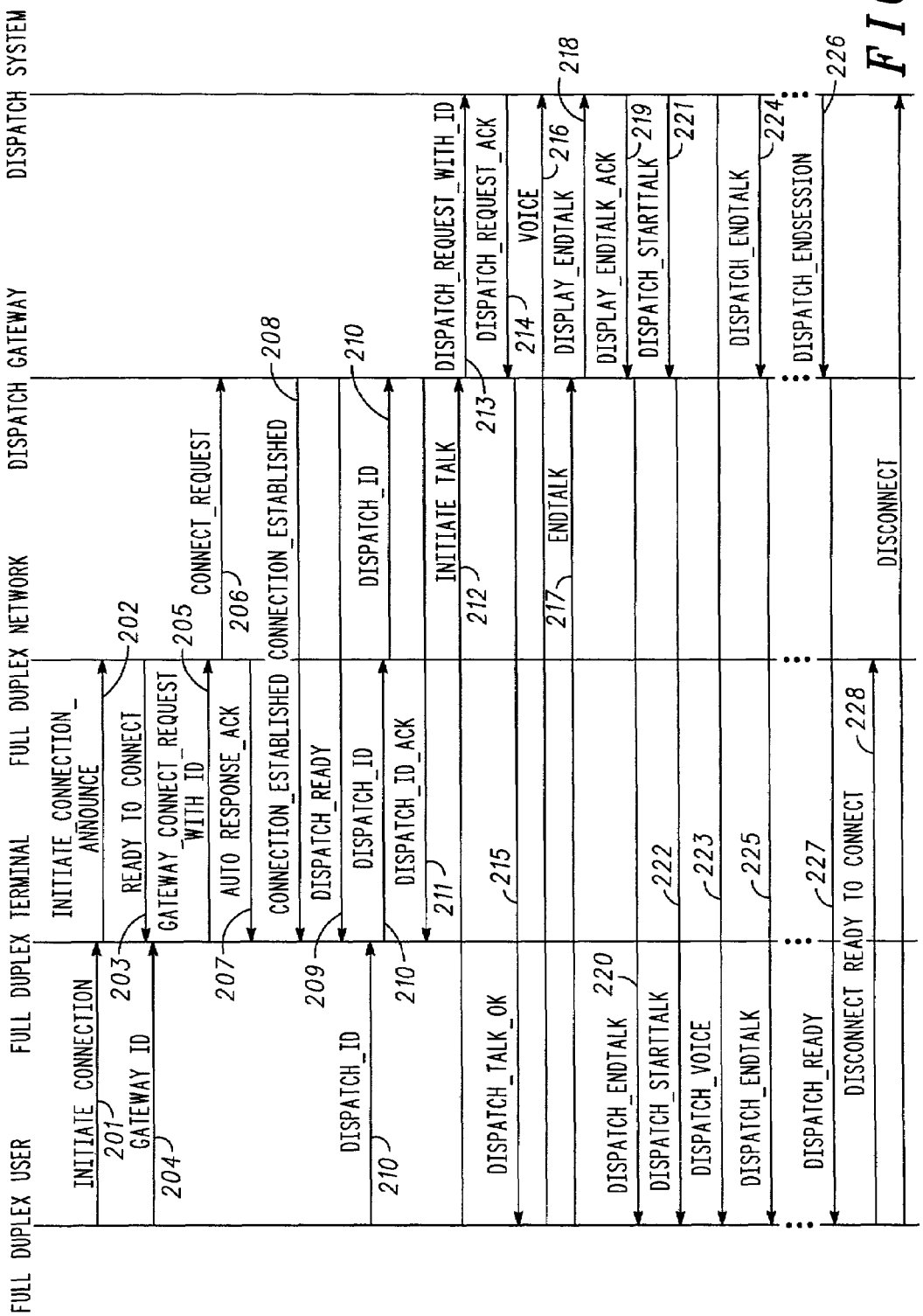
FIG. 2 is an example of the call flow sequence between a full-duplex terminal a telephone network supporting DTMF tones, and a half-duplex radio network.

In one example scenario, described in FIG. 2, the user of a full-duplex terminal 101, 102 initiates the call 201 by going off hook and initiating a connection announcement 202 to the full-duplex network 105. The full-duplex network 105 responds Ready to connect 203, with, for example, a dial tone sent to the terminal.

A gateway request connect 204 is made by the user, for example by dialing a special telephone number using DTMF tones into the full-duplex network 105 205 such as 1-800-DISPATCH. The fall-duplex network 105 relays the connect request to the primary dispatch gateway 206. The dispatch system responds to the request with an autoresponse message 207. A connection is established 208 through the dispatch gateway 120 from the dispatch RF system 150 through the full-duplex network 105 to the full-duplex terminal 101, 102, 103, 104.

The user enters a dispatch ID 210 using, for example, DTMF tones that is relayed through the full-duplex network 105 to the dispatch gateway 120. The user could, for example, enter the dispatch identification number followed by a DTMF key such as "#". The dispatch identification number may identify an individual or a group of users who have dispatch terminals 151, 152 connecting to the dispatch RF system 150 with whom the full-duplex network user wishes to communicate. The dispatch gateway 120 stores this dispatch ID in its memory 122 as the currently active dispatch ID and returns an audible dispatch acknowledgement signal through the switch to the full-duplex terminal 211.

The user initiates a push-to-talk from the full-duplex terminal 101, 102, 103, 104 by, for example, depressing a DTMF key such as "*", which is interpreted by the dispatch gateway 212. The DTMF tone initiated in 212 is interpreted by the dispatch gateway as a push-to-talk request, and the dispatch gateway sends a dispatch session initiation request to the dispatch RF system 150, and if the dispatch RF system 150 accepts the push-to-talk request, the dispatch gateway sends an audible acknowledgement through the switch to the full-duplex terminal 101, 102, 103, 104. This acknowledgement informs the user that the request to talk has been accepted, that a dispatch session has started, and that the voice channel has been committed for communication 215. Following this acknowledgement, the user on the full-duplex full-duplex terminal 101, 102, 103, 104 may begin sending voice communication to users of radios supported by the dispatch gateway. If the dispatch RF system 150 does not accept the push-to-talk request and does not initiate a dispatch session because, for example, the half-duplex users are unavailable, the dispatch gateway sends an audible error tone through the switch to the full-duplex terminal 101, 102, 103, 104 informing the user that the request failed.

The user of the full-duplex terminal 101, 102, 103, 104 may terminate and return control of the voice channel to the dispatch gateway by depressing a key on the full-duplex terminal 101, 102, 103, 104 keypad 217. For example, a special key such as "*" will produce a DTMF tone that will be relayed through the full-duplex network 105 to the dispatch gateway and interpreted as a release and termination of push-to-talk. This action is analogous to releasing the push-to-talk button on a half-duplex voice terminal 151, 152. An audible acknowledgement signal 220 will be sent from the dispatch gateway 120 to the full-duplex terminal 101, 102, 103, 104 indicating that push-to-talk has been released and the half-duplex users can reply.

A half-duplex radio terminal 151, 152 user may reply and initiate voice communication into a full-duplex full-duplex network 105 and supported terminals by depressing the push-to-talk mechanism a button on the radio. The dispatch RF system 150 signals the dispatch gateway that a target user has activated push-to-talk. The dispatch gateway generates a signal 221 that is relayed through the full-duplex network 105, which in turn relays the signal to the full-duplex terminal 101, 102, 103, 104. Voice communication initiated from the radio terminal 151, 152 to the full-duplex terminal 101, 102, 103, 104 may begin and continues until the half-duplex user releases push-to-talk.

The voice initiated by the half-duplex user may be terminated by the release of the push-to-talk mechanism button on the radio terminal 151, 152. The dispatch RF system 150 signals the dispatch gateway that push-to-talk has been released. The dispatch gateway generates an audible signal to indicate release of push-to-talk which is relayed through the full-duplex network 105 to the full-duplex terminal 101, 102, 103, 104. The full-duplex terminal 101, 102, 103, 104 user may then initiate another push-to-talk with the special DTMF key to continue the conversation. The full-duplex terminal 101, 102, 103, 104 user may also allow the dispatch session to time out after a pre-set time. After the dispatch session times out, the full-duplex terminal 101, 102, 103, 104 user may select another dispatch ID for further communication with another user or group of users. The full-duplex terminal 101, 102, 103, 104 user may also initiate another dispatch session to the same group of users. The full-duplex terminal 101, 102, 103, 104 user may also hang up at any time. The telephone user's act of hanging up terminates any active dispatch sessions and disconnects the call. Disconnection of the call 226-228 between the radio terminal 151, 152 and the full-duplex terminal 101, 102, 103, 104 is completed. All dispatch system and full-duplex network resources are returned.

FIG. 2 illustrates communication initiated by the full-duplex network user. In this embodiment, the dispatch user may also initiate communication provided that the full-duplex user is in a call as previously defined herein and provided that the full-duplex user is not in a dispatch session as previously defined herein. The state diagram of FIG. 3 illustrates this case as well, and is described more fully below.

The system illustrated in FIG. 1 may include a traditional telephone system also known as a Public Switched Telephone Network or PSTN providing plain old telephone service or POTS as part of the full-duplex network 105. Those skilled in the art will readily recognize that this invention is applicable to other full-duplex networks. For example, the full-duplex terminal could be an Integrated Services Digital Network or ISDN terminal attached to the PSTN. The full-duplex terminal 101, 102, 103, 104 could also be an H.323 or SIP terminal which could, for example, be implemented in software on a personal computer. In H.323-based, SIP-based, and other alternative embodiments, the signaling from the full-duplex terminal may be out-of-band signals rather than DTMF in-band signaling. However, as described herein, an interface between the full-duplex and half-duplex RF systems remains.

Figure 3:
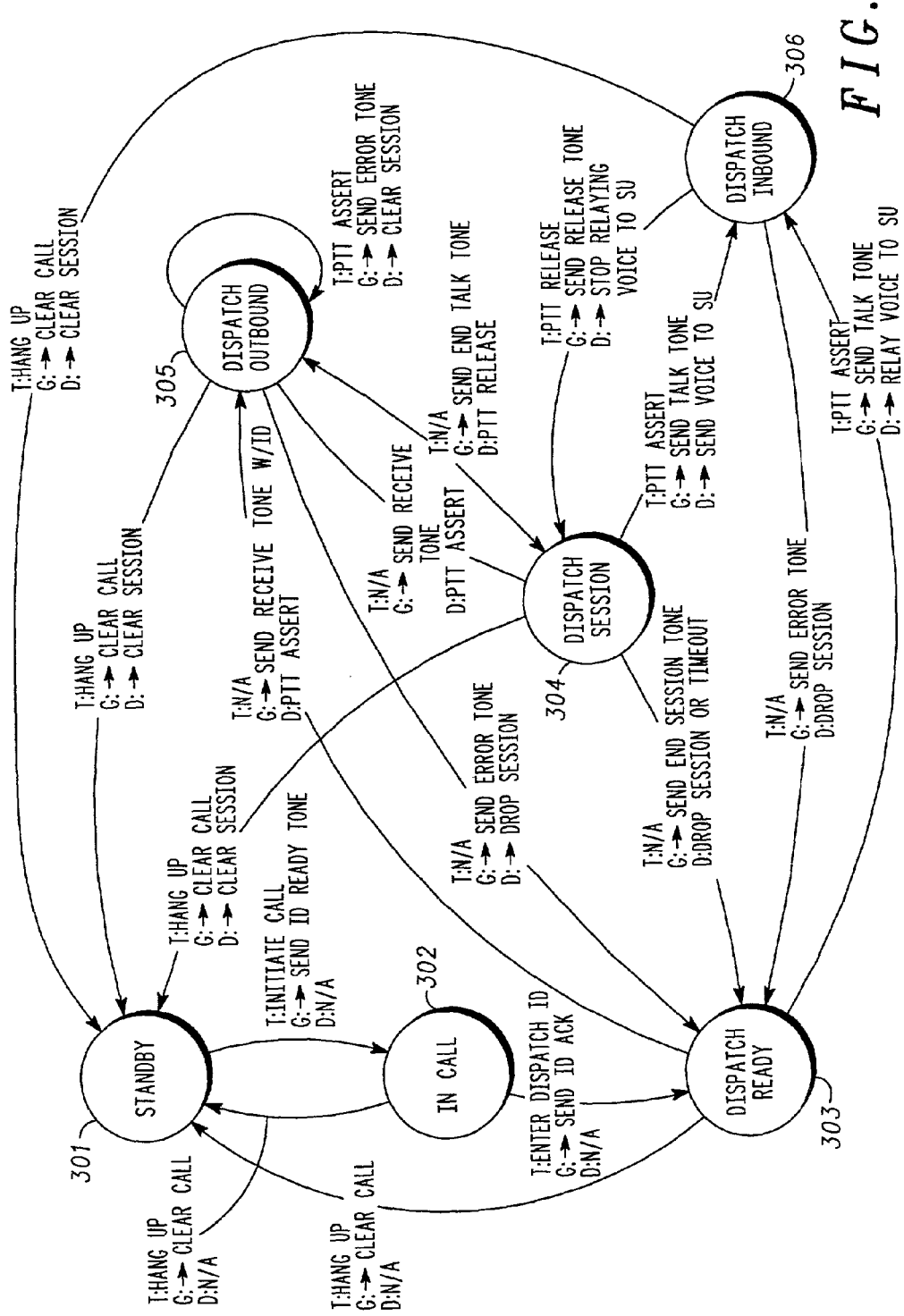
FIG. 3 is a state diagram of the states of an embodiment of the dispatch gateway shown in FIG. 1 between a full-duplex telephony network and a half-duplex radio network.

Referring now to FIG. 3, a state diagram of a dispatch gateway is shown. The dispatch gateway 120 may concurrently run many of these state machines to simultaneously support many dispatch conversations. The dispatch gateway state machines start in a Standby state 301 waiting for a call. Once a call is received through the full duplex network 105, the gateway answers the call and enters the In Call state 302. Many state transitions are possible from this point. State transitions are represented on the diagram by directional arrows. Text on or near the directional arrow indicates what inputs and outputs are associated with the state transition. The "T:" portion of this text indicates action and/or input from the full-duplex terminal 101, 102, 103, 104 received by the gateway from the full-duplex network 105. The "G:" portion of this text indicates action by the gateway 120. The "D:" portion of this text indicates the input from the dispatch RF system 150 preceding the arrow and/or action to be taken by the dispatch RF system 150 following the arrow. The notation "n/a" in any of the three portions of the state transition label text indicates that no input or action is associated with that part of the system full duplex terminal "T:", dispatch gateway "G:", or dispatch system "D:". The state diagram of FIG. 3 shows the state transitions for both dispatch-initiated and full-duplex initiated sessions. In the In Call state 302 the dispatch gateway waits for the full-duplex terminal user to enter a dispatch ID that the gateway will store as the currently active dispatch ID until the full-duplex user changes it or until a dispatch user or group initiates a dispatch session in which case the dispatch ID of that user or group becomes the current dispatch ID stored in the gateway. In the Dispatch Ready state 303 the full-duplex terminal user is ready to participate in dispatch sessions initiated by the full-duplex terminal user or by the dispatch system's users. In the Dispatch Session state 304, the Dispatch Outbound state 305, and the Dispatch Inbound state 306 the full-duplex terminal user is actively engaged in a dispatch session with a dispatch user or a dispatch group. In the Dispatch Outbound state 305, the dispatch user or group transmits voice through the dispatch gateway and the full-duplex system to the full-duplex terminal user. In the Dispatch Inbound state 306, the full-duplex terminal user transmits voice through the full-duplex system to the dispatch gateway and through the dispatch system to the dispatch user or dispatch group. Transitions between the Dispatch Session 304, Dispatch Outbound 305, and Dispatch Inbound 306 states can be caused by PTT requests from the dispatch and full-duplex users, by inactivity timeouts, and by dispatch system drops.

We claim:

1. A communication system comprising:
a first communication unit capable of communicating over only a full-duplex persistent-connection link;
a second communication unit capable of communicating over only a half-duplex link; and
a state machine coupled through a dispatch gateway to the first communication unit over the full-duplex persistent-connection link and coupled through the dispatch gateway to the second communication unit over the half-duplex link, wherein the state machine comprises a processor and a memory, and the processor is programmed to receive full-duplex voice signals from the first communication unit and to generate half-duplex voice signals from the full-duplex voice signals and to receive half-duplex voice signals from the second communication unit and to generate full-duplex voice signals from the half-duplex voice signals wherein the first communication unit communicates with the second communication unit using the generated half-duplex voice signals and the second communication unit communicates with first communication unit using the generated full-duplex voice signals.

2. The communication system according to claim 1, wherein the first communication unit is a persistent-connection based full-duplex terminal.

3. The communications system according to claim 2, wherein the first communications unit is one of a central switched based full-duplex terminal, a proxy controlled terminal and an intermediate call agent controlled terminal.

4. The communications system of claim 3, wherein one of the proxy controlled terminal and the intermediate call agent controlled terminal comprises either a SIP terminal or an H.323 terminal.

5. The communications system accoyding to claim 3, further comprising an intermediate switching system associated with one of the full-duplex link and the half-duplex link.

6. The communications system according to claim 1, wherein the full-duplex voice signals from the first communication unit uses dual tone multifrequency format (DTMF).

7. The communications system according to claim 1, wherein:
the state machine processor is programmed to receive a DTMF signal; and
the state machine is programmed to begin communication with the second communication unit over the half-duplex link in response to the DTMF signal.

8. The communication system according to claim 6, wherein;
the state machine processor is programmed to store call data concerning the half-duplex link;
the state machine processor is programmed to receive a DTMF signal; and
the state machine processor is programmed, in response to the DTMF signal, to receive the call data, to generate an audio message using the call data, and to transmit the audio message over the full-duplex persistent-connection link.

9. The communication system according to claim 1, wherein the communication over the half-duplex link uses a packet-driven format.

10. The communication system according to claim 1, wherein the second communication unit is a mobile terminal.

11. The communications system according to claim 10, wherein the mobile terminal is a radio frequency communication device selected from the group of radio frequency communication devices consisting of radio frequency telephones, pagers, personal digital assistants and radios.

12. An apparatus for permitting communications between a first communication unit capable of communicating over only a full-duplex persistent-connection link and a second communication unit capable of communicating over only a half-duplex link, the apparatus comprising:
a state machine coupled through a dispatch gateway to the first communication unit over the full-duplex persistent-connection link and coupled through the dispatch gateway to the second communication unit over the half-duplex link;
the state machine compromising a processor and a memory, the processor being programmed to receive full-duplex voice signals from the first communication unit and to generate half-duplex voice signals from the full-duplex voice signals and to receive half-duplex voice signals from the second communication unit and to generate full-duplex voice signals from the half-duplex voice signals wherein the first communication unit communicates with the second communication unit using the generated half-duplex voice signals and the second communication unit communicates with first communication unit using the generated full-duplex voice signals.

13. The apparatus according to claim 12, wherein:
the first communication unit comprises a persistent connection based full-duplex terminal.

14. The apparatus according to claim 13, wherein the first communication unit comprises one of an intermediary device, a switch and a call agent.

15. The apparatus according to claim 14, wherein the call agent comprises one of a H.323 terminal and a SIP terminal.

16. The apparatus of claim 12, wherein the mobile terminal comprises one of a radio frequency telephone, a pager and a personal digital assistant.

17. The apparatus according to claim 12, in combination with an intermediary call agent.

18. The apparatus according to claim 12, wherein the first communication unit comprises either a SIP terminal or a H.323 terminal.

19. The apparatus according to claim 12, wherein the full-duplex voice signals from the first communication unit uses dual tone multifrequency format (DTMF).

20. A method for interworking a first communication unit capable of communicating over only a full-duplex persistent-connection link and a second communication unit capable of communicating over only a half-duplex link, the method comprising the steps of:
receiving full-duplex voice signals from the first communication unit;
generating half-duplex voice signals from the full-duplex voice signals;
receiving half-duplex voice signals from the second communication unit,
generating full-duplex voice signals from the half-duplex voice signals; and
wherein the first communication unit communicates with the second communication unit using the generated half-duplex voice signals and the second communication unit communicates with first communication unit using the generated full-duplex voice signals.

* * * * *